June 22, 1937.  A. C. ENGELHEART  2,084,612
PORTABLE ELECTRIC GENERATOR
Filed Aug. 4, 1936

A. C. Engelheart INVENTOR
BY Victor J. Evans & Co.
ATTORNEYS

Patented June 22, 1937

2,084,612

UNITED STATES PATENT OFFICE 2,084,612

PORTABLE ELECTRIC GENERATOR

Alexis C. Engelheart, Memphis, Tenn.

Application August 4, 1936, Serial No. 94,238

2 Claims. (Cl. 171—252)

This invention relates to portable electric generators and pumps and has for an object to provide a portable generator and power transmission devices which may be actuated by a sweep to which an animal may be attached the device being light, strong and durable, and particularly adapted to charge storage batteries for farm lighting purposes, as well as to drive other apparatus such as a pump.

A further object is to provide a novel compact assembly of the generator and high and low speed gear devices, the high speed gear devices being driven by the sweep to actuate the armature of the generator while the low speed devices are simultaneously driven by the sweep to operate selected farm machines.

A further object is to provide apparatus of this type which will be formed of a few simple parts, which may be inexpensively manufactured and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1:
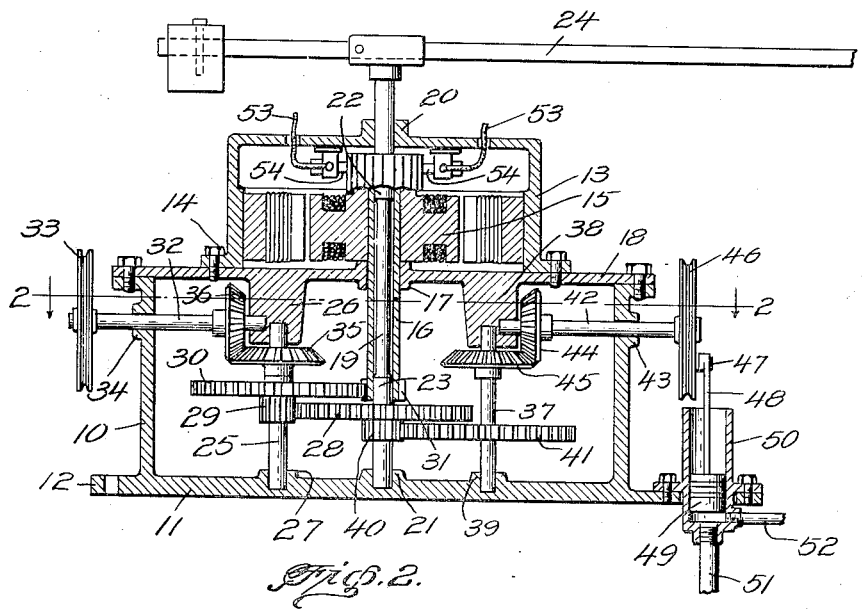
Figure 1 is a longitudinal sectional view, with parts in elevation, of apparatus constructed in accordance with the invention.
Figure 2:
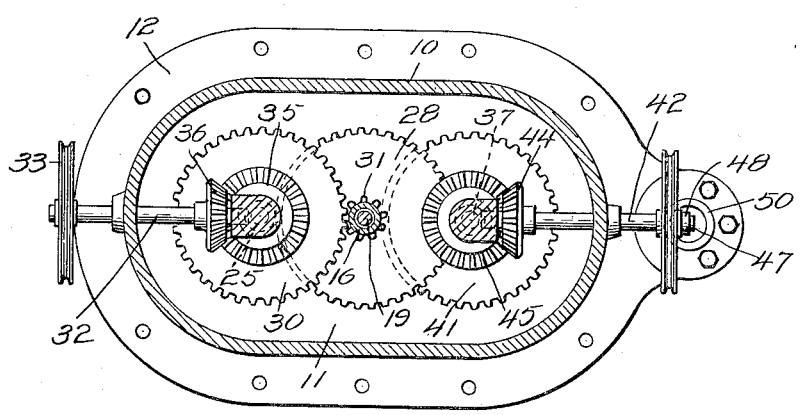
Figure 2 is a cross sectional view taken on the line 2—2 of Figure 1, showing the gear mechanism in plan.

Referring now to the drawing in which like characters of reference designate similar parts in the various views, 10 designates a housing which is mounted upon a base plate 11 having a perforated marginal flange 12 which may be bolted or otherwise secured to a suitable support for transportation.

An electric generator 13 is bolted to the top of the housing as shown at 14. The armature 15 of the generator is fixed to a hollow shaft 16 which is rotatably mounted in a bearing 17, mounted in the cover plate 18 of the housing 10.

A vertical shaft 19 is journaled in bearings 20 and 21 on the generator and on the base plate respectively and this shaft is equipped with a pair of spaced shoulders 22 and 23 upon which the hollow shaft 16 rotates independently of the vertical shaft 19. The shaft 19 extends through and above the armature 15 of the generator and carries an animal operated sweep 24.

A vertical counter shaft 25 is mounted laterally of the main shaft 19 in bearings 26 and 27 on the cover plate 18 and base plate 11 of the housing respectively. A gear 28 is fixed to the main shaft 19 and meshes with a pinion 29 fixed to the countershaft 25. A gear 30 is fixed to the countershaft and meshes with a pinion 31 fixed to the hollow shaft 16 of the generator. These gears and pinions constitute a step up gearing by means of which the armature of the generator is rotated at high speed from the main shaft 19.

A horizontal shaft 32 is equipped with a belt pulley 33 for supplying power to any desired machinery. This shaft is journaled in a bearing 34 in the housing 10 and in the beforementioned bearing 26. The horizontal shaft is driven from the countershaft 25 by means of a bevel gear 35 which is fixed to the countershaft and meshes with a bevel gear 36 which is fixed to the horizontal shaft 32.

A second countershaft 37 is mounted in bearings 38 and 39 on the opposite side of the main shaft 19 from the beforementioned bearings 26 and 27. A pinion 40 is fixed to the main shaft 19 and meshes with a gear 41 fixed to the countershaft 37, the pinion and gear constituting step down motion transmission gearing so that the countershaft 37 will be driven by the main shaft 19 at a lower speed than the latter.

A horizontal shaft 42 is mounted in a bearing 43 on the housing and in the beforementioned bearing 38 and is geared to the vertical shaft 37 by meshing bevel gears 44 and 45. The outer end of the horizontal shaft 42 is equipped with a belt pulley 46 having an eccentric pin 47 to which is secured an eccentric rod 48 which actuates the piston 49 of a suction pump 50 having the usual intake pipe 51 and outlet pipe 52.

From the above description it will be seen that while the pump is being operated to elevate water from a well, the generator will be simultaneously operated to furnish current for re-charging farm batteries or the like. Circuit wires 53 lead from the brushes 54 and the leads to the batteries to be charged or other electrical apparatus to be supplied with current may be connected to these circuit wires 53.

From the above description it is thought that the construction and operation of the invention will be fully understood without further explanation.

What is claimed is:

1. In a device of the class described, a housing, an electric generator mounted on the housing, a vertical shaft journaled in bearings in the ends of the housing and extending through and above the armature of the generator, a sweep secured to the upper end of the shaft, means supporting the armature of the generator for rotary movement independently of the vertical shaft, a sleeve surrounding the shaft and extending into the housing, the armature of the generator being fixed to the sleeve, vertical countershafts mounted in the housing at opposite sides of the first named vertical shaft, horizontal shafts journaled in the housing and geared to the countershafts, a step up gearing connecting one of the countershafts to the first named vertical shaft and to the sleeve for rotating and armature of the generator at a greater speed than the speed of the first named vertical shaft, a step down gearing connecting the first named vertical shaft with the other countershaft, and means on the horizontal shafts for transmitting power from the shafts.

2. In a device of the class described, a housing, an electric generator mounted on the housing, a vertical shaft journaled in bearings in the ends of the housing and extending through and above the armature of the generator, a sweep secured to the upper end of the shaft, means supporting the armature of the generator for rotary movement independently of the vertical shaft, a sleeve surrounding the shaft and extending into the housing, the armature of the generator being fixed to the sleeve, vertical countershafts mounted in the housing at opposite sides of the first named vertical shaft, horizontal shafts journaled in the housing and geared to the countershafts, a step up gearing connecting one of the countershafts to the first named vertical shaft and to the sleeve for rotating the armature of the generator at a greater speed than the speed of the first named vertical shaft, and a step down gearing connecting the first named vertical shaft with the other countershaft, both of the horizontal shafts being equipped with pulleys.

ALEXIS C. ENGELHEART.